AUTOMATIC UNLOADING WASHING MACHINE

Original Filed April 27, 1967 3 Sheets-Sheet 1

INVENTOR.
Martin Hutterer
BY
McGregor & Eisenman
ATTORNEYS

AUTOMATIC UNLOADING WASHING MACHINE

Original Filed April 27, 1967 3 Sheets-Sheet 2

INVENTOR.
Martin Hutterer
BY
McGregor & Eisenman
ATTORNEY

AUTOMATIC UNLOADING WASHING MACHINE

Original Filed April 27, 1967 3 Sheets-Sheet 3

INVENTOR.
Martin Hutterer
BY
Mc Gregor & Eisenman
ATTORNEY

United States Patent Office

Re. 27,189
Reissued Oct. 12, 1971

27,189

AUTOMATIC UNLOADING WASHING MACHINE

Martin Hutterer, Forest Hills, N.Y., assignor to Cummings-Landau Laundry Machinery Co., Inc., Brooklyn, N.Y.

Original No. 3,417,583, dated Dec. 24, 1968, Ser. No. 634,247, Apr. 27, 1967. Application for reissue Feb. 2, 1970, Ser. No. 15,378
Int. Cl. D06f *37/06*
U.S. Cl. 68—210 7 Claims

Matter enclosed in heavy brackets [ ] appears in the original patent but forms no part of this reissue specification; matter printed in italics indicates the additions made by reissue.

ABSTRACT OF THE DISCLOSURE

A self-unloading laundry machine of the commercial type, including a horizontal axis, rotary basket in a water-tight housing with aligned access doors in a portion of the top half of each for loading and unloading. The entire machine including its driving motors is carried by a frame mounted on pivots spaced forwardly from the axis of rotation of the basket and double-acting jacks and controls are provided to rotate the assembly upwardly at predetermined rates around the pivots for an angular distance to aim the aligned doors downward to cause the load to drop out of the basket. The jacks are controlled as the unit moves over top center to bring the assembly to rest at an over-centered position by reversing the forces applied to the piston rods of the jacks. The basket includes access doors and, internally, a flat surface extending across a chord of the circle from the edge of the access door opening to a point part way around the circle, thereby forming a slide to prevent the hanging up of the work load in the basket in the portion nearest the pivot when the machine is in unloading attitude.

It has been proposed in the past, in the field of commercial laundry equipment, to provide for self or automatic unloading by inverting the machine so that the work load, which was originally dropped or side-loaded into the basket with the machine in its normal attitude, falls out of the same access door by gravity. Not only does this unloading technique present difficult mechanical design problems because of the large sizes of commercial machines and heavy work loads (up to 1500 pounds dry) but there is a tendency for the wet or damp work to hang up within the inverted basket at the edges of the door. This is caused by design limitations in the sizes of the access doors and in the angular travel through which an entire machine can be pivoted on its base to swing the machine up and away from its base so that the load can drop into a receptacle such as a wheeled cart on the same floor as the machine.

In accordance with the present invention, the entire cylindrical housing is mounted on pivots disposed forwardly of the pivotal axis of the inner basket and near the front of the base at a point raised from the floor sufficiently high to carry the unit to an elevated position forwardly of the base when it is inverted. This attitude necessarily moves the center of gravity of the machine and its wet load over top center. To accommodate this action in which forces reverse direction vertically, double-acting hydraulic jacks react between the base and the pivoted housing first to swing the housing to its top center position where its weight is carried entirely by the pivots and thereafter to restrain or ease its motion by reversing the forces in the piston rods of the jacks from compression to tension. This can be accomplished, for example, by controlling pressure on the back side of the piston to allow the housing to settle into its final unloading attitude. The motion of the jacks can be further controlled, if desired, to permit rapid up and down speed control before the machine reaches its final loading or unloading position.

The access doors in both the housing and basket through which the work is loaded into the basket, are located in the upper front quadrant of the cylindrical profile and extend over an arc of a circle which is somewhat less than 90° both to make the doors manageable and to preserve the structural rigidity of the basket and housing. The access doors of the housing are normally located above and rearwardly of the pivots. In unloading attitude, the doors are disposed primarily in the lower front quadrant, but as a result of angular travel in excess of 90°, a small portion of the opening is disposed in the lower rear quadrant. There results a portion of the basket in the lower rear quadrant which has a significant horizontal component forming a pocket in which the work load can hang. In order to effect the discharge of the load from this pocket, a fixed slide is built into the basket which forms a chord of the circle of the basket defining, when the machine is in its unloading attitude, a downwardly inclined plane which terminates at the door opening. The slide will be disposed at least partially in the lower front quadrant when the machine is in its loading and washing position but because of its limited length does not interfere with the normal washing action of the oscillating basket.

A preferred embodiment of the invention from which the above and other features will be readily understood is described in the following specification having reference to the accompanying drawing, in which.

Figure 1:
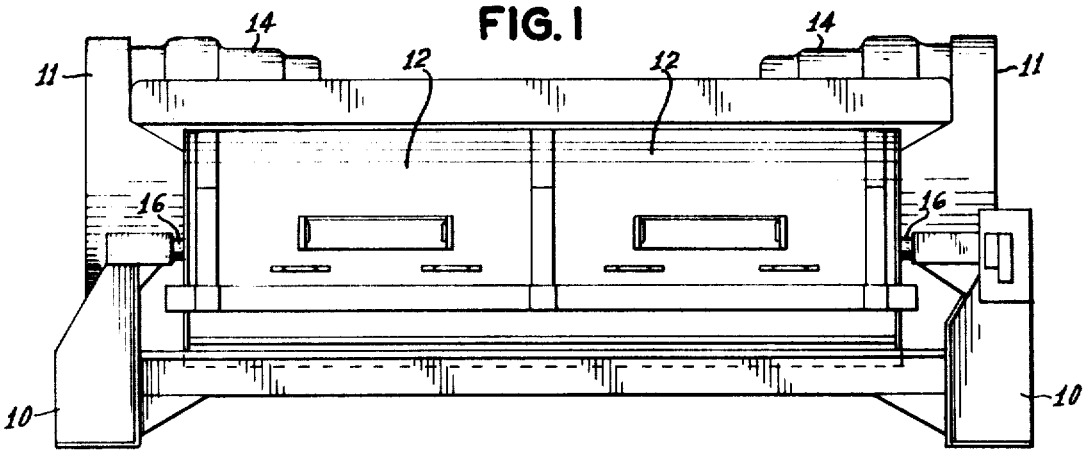
FIG. 1 is a view in front elevation of a commercial washing machine in its normal loading and washing position.
Figure 2:
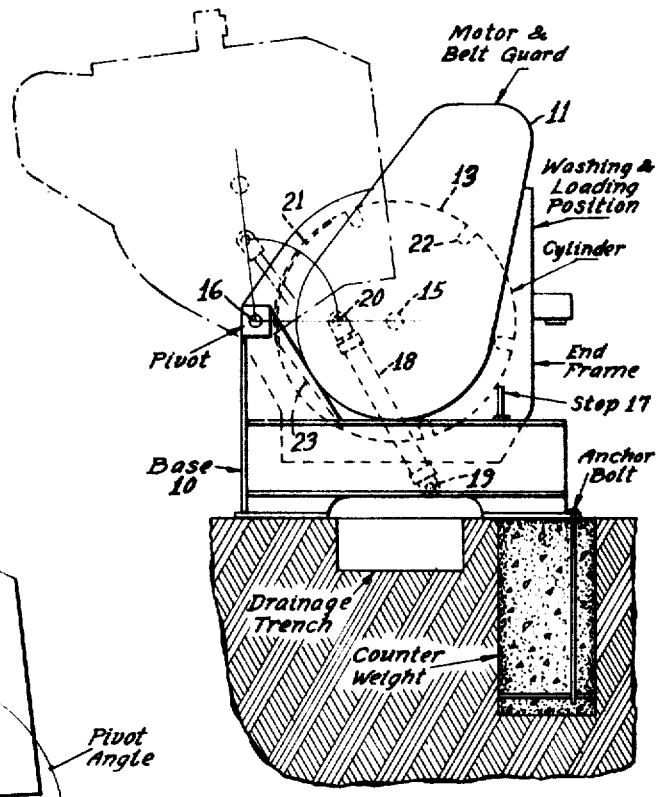
FIG. 2 is a view in end elevation of the machine of FIG. 1 with the basket shown in broken lines and in which details of the machine not essential to the practice of the present invention have been omitted.

Referring to the drawings, there is illustrated a commercial washing machine including a floor-mounted base 10, a water-tight housing or tub portion 11 having access doors 12 and an internal drum or basket 13 adapted to be driven in oscillatory or rotary motion by motors 14 mounted on the housing 11. The basket 12 is mounted to turn on a horizontal axis 15 (FIG. 2) and the housing 11 is coupled to the base 10 through pivot bearings 16 located preferably at the approximate height of the drum axis 15 and forwardly thereof. In addition to the support of the pivot bearing 16, the housing rests on the frame 10 near its back edge on supports 17 (FIG. 2). Coupled between the base 10 and the housing 11 at either end thereof are a pair of hydraulic jacks 18. The pivot or coupling point 19 of each jack 18 on the base 10 is at a point preferably slightly rearwardly of the drum axis 15 at a point near the floor, with the complementary or opposite end of each jack being coupled at a pivot point 20 to the end of the housing disposed at generally the same level as the pivot axis 16 and the rotary axis 15 of the housing and basket respectively and at a point between the two axes, all as best seen in FIG 2.

The work load is introduced into the machine with the housing disposed in its position as shown in FIG. 2, through the access doors 12 in the housing and through a second set of access doors 21 in the basket. With both sets of doors closed, the washing cycle is begun in the conventional manner under the control of the driving motors. It will be observed that in the loading attitude, the doors are located in the upper front quadrant of the cylindrical profile of the housing and basket affording a convenient height and position for dropping the dry load into the basket.

Internally the basket is formed with transverse ribs 22 circumferentially arranged about its internal periphery and extending radially into the basket area, all in accordance with conventional design practice in commercial washing machines. In addition, in the lower front quadrant of the basket as viewed in FIG. 2, there is disposed a chord plane or slide 23 preferably so arranged that at no point does it project radially into the basket space for a distance greater than the projection of the ribs 22.

Figure 3:
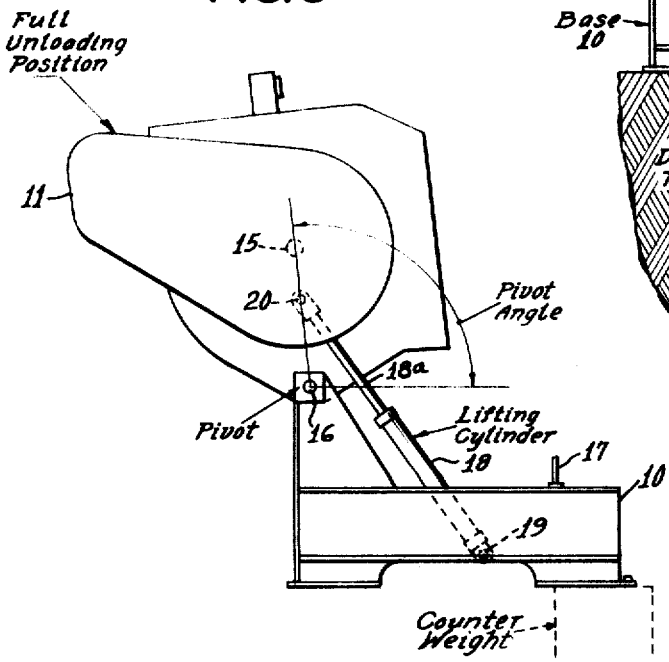
FIG. 3 is a view corresponding to FIG. 2 but showing the machine in its unloading attitude.
Figure 4:
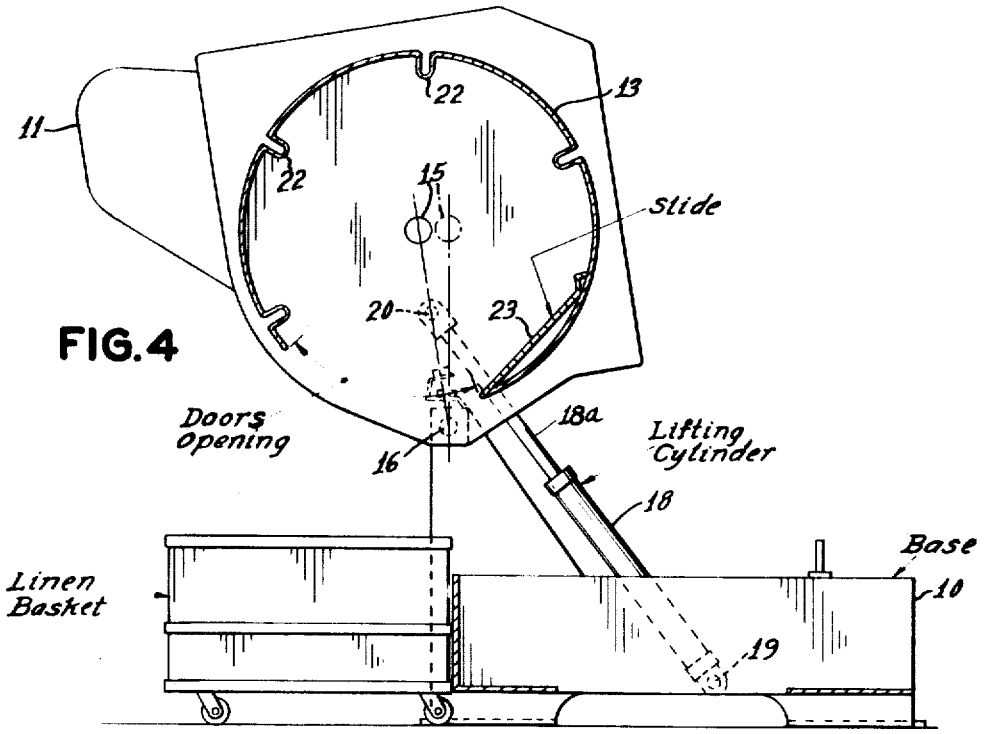
FIG. 4 is a view in cross-section through the basket or drum of the washing machine in its dumping or discharging position.

At the conclusion of the washing and rinsing cycles, and after the water is drained from the housing and basket, both sets of access doors 12 and 21, which are brought into alignment, are opened and the hydraulic jacks 18 are actuated to swing the entire housing upwardly and forwardly on the pivots 16. As the housing swings upwardly and forwardly, it reaches a point at which the center of gravity rests directly over the pivots 16. At this time and by means presently to be described, the forces in the piston rods 18a of the jacks 18 are reversed from compression to tension by controlling the pressure on the back sides of the jack pistons as the center of gravity on the housing moves over top center, thus restraining the downward free-falling motion which continues for another 5 to 10° to the final position as shown in FIGURE 3. This represents the unloading position and at this time the aligned door openings of both the housing and the basket are located primarily in the lower front quadrant but extend partially into the lower rear quadrant. The combined action of the forward thrust of the housing as it reaches it ultimate unloading position, coupled with the action of the slide plane 23 which bridges the pocket in the basket which then occurs at the lower rearmost edge of the door openings, causes the work load to fall under the force of gravity from the basket and into a waiting receptacle, such as indicated in FIG. 4. The angle of inclination of the slide in discharging position preferably ranges between 15° and 45° to the horizontal, depending on the nature of the work load for which the machine is designed. Thereafter the housing is returned to its initial position where it can be loaded to begin another washing cycle.

Figure 6A:
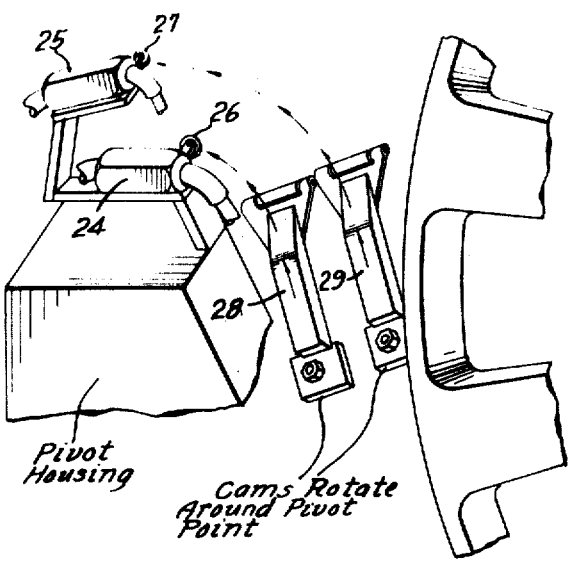
FIGS. 6A and 6B are enlarged views showing the details of valve controls for the hydraulic system.
Figure 6B:
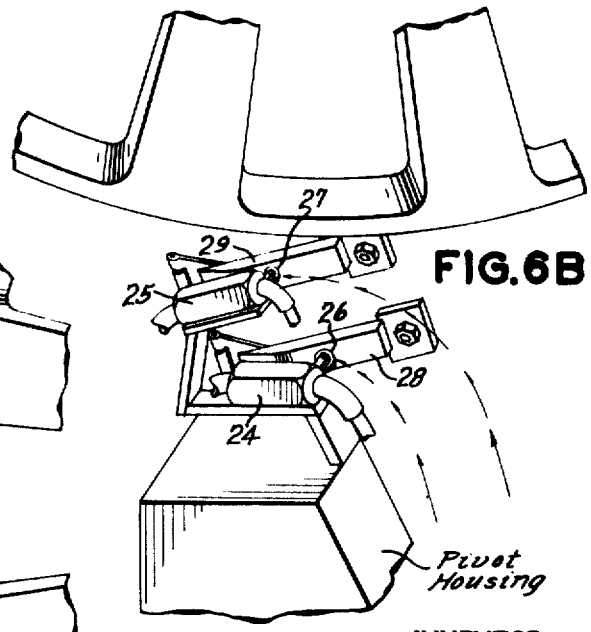
Figure 5:
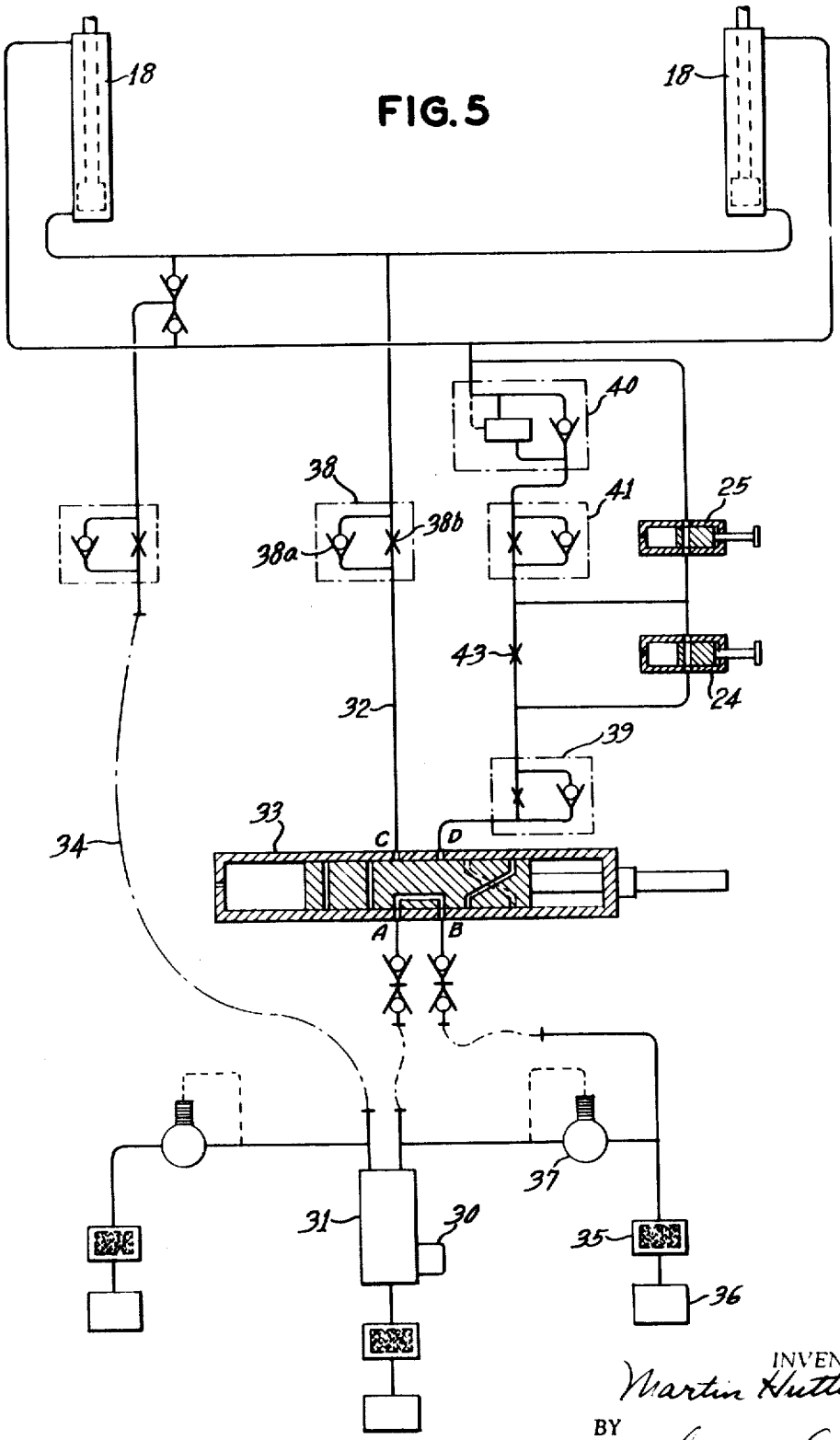
FIG. 5 is a schematic diagram of the hydraulic control system for swinging the machine on its pivots between loading and unloading positions.

The hydraulic control system includes the double-acting jacks 18 which lift the machine from the loading and running position to the unloading position and back again under the control of cam-actuated hydraulic valves 24 and 25 (FIGURES 5 and 6A–6B) carried by the base 10 and including roller actuators 26 and 27 which are positioned to be engaged by adjustable cam actuators 28 and 29 which move with the pivoted housing 11.

A motor 30 drives a piston-type hydraulic pump 31 having a principal output 32 connected to the jacks 18 through a master control valve 33 and secondary output 34 connected to the jacks as a replenishing circuit.

When control valve 33 is in its inactive position and the pump is running, oil is pumped through port A to port B and through a filter 35 to a reservoir 36. When the valve 33 is actuated, port A will be connected to port C and port D to port B, causing the pump 30 to deliver oil under pressure to the bottoms of the jacks 18. The amount of the pressure is controlled through a relief valve 37 set to a pressure slightly higher than that which is required to lift the machine including the work load.

In the line 32 from the port C leading to the bottoms of the jacks 18 is a flow control valve 38 which, however, is rendered active on the upstroke by a bypass check valve 38a around a restricted opening 38b and which controls downspeed.

To control the upward speed of the cylinders, the flow of oil out of the upper end of the jacks is controlled in three stages.

As one means of achieving a rapid upstroke, a flow control valve 39 in the return path is set to allow the oil to flow back to port D and B at a rate of approximately 1″ of piston movement per second. As the housing is lifted around its pivoting point, less and less pressure is needed to lift it until a position is reached where the system is balanced on center. As the housing is moved farther out, the load and the weight of the housing and load will tend to swing the housing outward and downward. To fully control this movement over center, the oil flow is now further restricted by means of a counter balance valve 40 in series with a flow control valve 41 set for a pressure slightly higher than the combined weight of the load and the housing would exert on the cylinders when moved all the way to the unloading position. The cutting in of the counter balance valve 40 and flow control valve 41 is controlled by the normally open cam operated valve 25 through which the oil passes freely until it is closed by the cam 29. From this point on the unloading position, the counter balance valve 41 will hold the machine in any location regardless of the setting of the control handle of valve 33, unless the pump 30 pushes oil out of the rod or upper end of the jacks against the pressure setting of the counter balance valve by opening its spring-loaded seat. Oil will then flow through this valve and the flow control valve 41 through the normally open cam valve 24 which is in parallel with a needle valve 43, and from there through flow control valve 39 and port D and B back to the reservoir 36. Valve 24 is actuated by the other cam 28 and will close shortly before the machine is moved all the way out to the unloading position. The closing of the valve 28 forces the oil from the upper or rod end of the jack to pass through a needle valve 43 which further restricts the oil flow sufficiently to make the housing come to a smooth stop when moved all the way out.

To return the housing to the loading position, the handle of valve 33 is actuated to start the pump. Oil will now flow from pressure port A to port D through the bypass ball check of valve 39 through needle valve 43 and the bypasses of valves 41 and 40 to the upper ends of the jacks. The needle valve 43 restricts this flow of oil until the valve 24 is released by its track and opens. Thereafter the motion is controlled by the valve 38 in the line leading from the bottoms of the jacks to port C and from there to B. Before the housing comes to rest on the base or frame the speed is controlled by proper setting of the valve 33 which also regulates the oil flow from the bottoms of the jacks.

While the invention has been described above having reference to a preferred embodiment, it should be understood that it can take other forms and arrangements, and should not therefore be regarded as limited except as defined in the accompanying claims.

I claim:

1. A self-unloading washing machine comprising a generally cylindrical washing basket having a horizontal axis of movement and a housing for the basket, access door means in the housing and basket normally disposed in aligned relationship in an upper surface thereof, a base, pivot means on the base to support the housing on an axis spaced from the axis of motion of the basket, jack means to swing the housing around the pivot to invert the housing and basket, and a slide plate mounted in the basket extending across a *minor* portion of the cylindrical inner surface of the basket and terminating at one end adjacent the access door to form a slide to discharge the work from the inverted basket.

2. Apparatus as set forth in claim 1, said slide plate [covering] being inclined toward the access door when the basket is inverted to form a slide having an angle of inclination of between 15 and 45 degrees.

3. Apparatus as set forth in claim 2, said access doors being disposed substantially in an upper quadrant for loading and predominately in one lower quadrant but partially in the other lower quadrant for self-loading, said slide plate being disposed in said other lower quadrant.

4. Apparatus as set forth in claim 1, said pivot means being disposed on an axis on a level near the level of the axis of movement of the basket but spaced horizontally therefrom, said jack being connected to the frame adjacent the floor and to the housing at a point between the axis of the pivot means and the axis of movement of the basket, and control means to energize the jack means to swing the housing upwardly about the pivot means to a central point at which the pivot means bears all of the weight of the housing, and means to control the jack after the housing passes the central point to restrain the housing to lower it to an unloading angular position over the central point.

5. Apparatus as set forth in claim 4, said control means including cam means having complementray portions on the housing and base.

6. Apparatus as set forth in claim 1 wherein said slide plate defines a chord across said *minor* portion of the cylindrical inner surface of the basket.

*7. A self-unloading washing machine comprising a generally cylindrical washing basket having a horizontal axis of movement and a housing for the basket, access door means in the housing and basket normally disposed in aligned relationship in an upper surface thereof, a base, pivot means on the base to support the housing on an axis spaced from the axis of motion of the basket, jack means to swing the housing around the pivot to inert the housing and basket, transverse ribs circumferentially disposed about the internal periphery and extending radially into said washing basket, and a slide plate mounted in said basket extending across a minor portion of the cylindrical inner surface of the basket and projecting radially into the basket space for a distance less than the projection of said ribs, said slide plate terminating at one end adjacent the access door to form a slide to discharge the work from the inverted basket.*

References Cited

The following references, cited by the Examiner, are of record in the patented file of this patent or the original patent.

UNITED STATES PATENTS

| | | | |
|---|---|---|---|
| 1,627,730 | 5/1927 | Ehnts | 68—210 X |
| 2,332,186 | 10/1943 | Zimarik | 68—210 |
| 2,436,883 | 3/1948 | Ellis | 68—210 X |

WILLIAM I. PRICE, Primary Examiner